United States Patent

Moore

[15] 3,671,599
[45] June 20, 1972

[54] OXIDATIVE DEHYDROGENATION OF MULTICYCLIC HYDROCARBONS

[72] Inventor: Robert E. Moore, Wilmington, Del.

[73] Assignee: Sun Research and Development Co., Philadelphia, Pa.

[22] Filed: March 24, 1971

[21] Appl. No.: 127,784

[52] U.S. Cl. .................................260/666 PY, 260/666 M
[51] Int. Cl. .........................................................C07c 13/28
[58] Field of Search ...............................260/666 M, 666 PY

[56] References Cited

OTHER PUBLICATIONS

W. H. Lunn et al. Tetrahedron, Vol. 24, pp. 6,773– 6,776, 1968

Primary Examiner—Delbert E. Gantz
Assistant Examiner—Veronica O'Keefe
Attorney—George L. Church et al.

[57] ABSTRACT

Conjugated dienes of polycyclic naphthenes having three to 11 rings of five to six carbon atoms each of which at least three are adjacent fused rings are produced by contacting the polycyclic naphthenes with a strong acid and a monool or diol of an adamantane hydrocarbon having zero to four alkyl groups with at least one alkyl group at a non bridgehead position when the number of alkyl groups is four at a reaction temperature between the freezing point of the acid and 50° C., and recovering a polycyclic conjugated diene from the reaction mixture.

8 Claims, No Drawings

3,671,599

OXIDATIVE DEHYDROGENATION OF MULTICYCLIC HYDROCARBONS

CROSS REFERENCE TO RELATED APPLICATIONS

My copending application Ser. No. 127,772 filed Mar. 24, 1971 of even date herewith discloses and claims the isomerization of polycyclic hydrocarbons having a carbon range of between six and 30 carbon atoms in the presence of fluoro sulfonic acid and sulfuric acid having an acid strength of between 85 to 102% $H_2SO_4$ equivalent by weight sulfuric acid and an adamantane hydrocarbon having at least one unsubstituted bridgehead position.

BACKGROUND OF THE DISCLOSURE

1. Field of The Invention

This invention relates to a novel oxidative dehydrogenation process for preparation of conjugated dienes of polycyclic naphthenes having three to 11 rings of five to six carbon atoms each, of which at least three are adjacent fused rings.

Description of The Prior Art

Conventional dehydrogenation techniques generally have not been successful with polycyclic naphthenes. The instability of the unsaturated product at the extreme conditions necessary for conventional methods makes it very difficult to recover and the problem is even more severe when conjugated dienes are formed. Lunn and Farkas, Tetrahedron, Vol. 24, pp. 6,773–6,776 1968 teach the production of a monolefin of estrone using fluorosulfonic acid or sulfuric acid and adamantanol in pentane. The authors do not teach the formation of conjugated dienes from polycyclic naphthenes.

It is the object of this invention to provide a novel process for the production of conjugated dienes from polycyclic naphthenes having three or more fused rings of five to six carbon atoms each whereby the process conditions are not extreme and the diene product can be isolated without difficulty.

SUMMARY OF THE INVENTION

It has now been found, in accordance with the present invention, that conjugated dienes of polycyclic naphthenes having three to 11 rings of five to six carbon atoms at least three of which are adjacent fused rings can be prepared by contacting the polycyclic naphthene with a strong acid selected from the group consisting of sulfuric acid with a strength of 100–105% $H_2SO_4$ equivalent by weight, polyphosphoric acid, hydrogen fluoride-boron trifluoride [$HF \cdot BF_3$], boron trifluoride etherate $BF_3 \cdot O(C_2H_5)_2$ and a monool or diol of an adamantane hydrocarbon having zero to four alkyl groups with at least one alkyl group at a nonbridgehead position when the number of alkyl groups is four, at a reaction temperature between the freezing point of the acid and 50° C.

Generally the conjugated dienes produced by the invention are useful as free-radical inhibitors, antioxidants and ultraviolet light stabilizers for a wide variety of compounds, e.g., lubricating oils and polymers like polypropylene.

DESCRIPTION OF THE INVENTION

The preparation of the conjugated dienes of polycyclic naphthenes having three to 11 rings of five to six carbon atoms each of which at least three are adjacent fused rings involves contacting a mixture of the polycyclic naphthene and the monool or diol of an adamantane compound with a strong acid. The molar ratio of the adamantane compound to the polycyclic hydrocarbon can vary widely in the mixture for example from 1:1 to 5:1 but preferably about 2:1. The ratio of the hydrocarbon mixture to acid can also vary widely. Generally, a volume ratio thereof in the range of 1:1 to 1:20 more preferably 1:10. The mixture normally is an emulsion of acid and hydrocarbon phases and the reaction takes place in the acid phase. When using sulfuric acid the strength should be in the range of 98–105% $H_2SO_4$ equivalent by weight and it is more preferable to employ fuming sulfuric acid having $H_2SO_4$ equivalent in the range of 100–103 percent by weight. Maximum yields of the desired product can be more readily obtained when fuming sulfuric acid is used.

Another mineral acid which can be used is polyphosphoric acid. Lewis acids like boron trifluoride etherate and hydrogen fluoride-boron trifluoride complex are also employed.

The reaction temperature can be from just above the freezing point of the acid used to about 50°C. but preferably between 10°–30° C. The rate of reaction will depend upon the reaction temperature selected. At temperatures higher than 50° C. the formation of dimers may become an undesirable side reaction. In general when the polycyclic hydrocarbons and the monool or diol adamantane compound are mixed with the acid a two phase system is formed since the polycyclic napthenes has a relatively low solubility in the acid. As the molecular weight of the polycyclic naphthenes is increased, the rate of dissolution in acid tends to decrease and longer mixing times are required to effect complete solution. In cases when a normally solid monool and diol adamantane is used, it is advantageous to add it to the acid in form of finely divided powder to facilitate solubilization.

The process appears to involve a carbonium ion mechanism involving hydride ion abstraction and subsequent proton elimination to form conjugated dienes.

After the reaction has been completed, the acid phase is quenched over ice and the aqueous phase extracted with diethyl ether. The ether is removed, leaving the desired conjugated diene. The product generally includes some dimeric material and must be removed from the conjugated diene by distillation.

The polycyclic naphthenes which are useful in accordance with this invention can be any polycyclic naphthene having three to 11 rings of five to six carbon atoms each of which at least three are adjacent fused rings. Preferred polycyclic napthenes reactants comprise the polycyclic naphthenes of the $C_{12}$–$C_{30}$ range. Included among these are perhydroaromatic hydrocarbons.

As a general rule perhydroaromatics of the class used in practicing the present invention are not readily available. However, the corresponding aromatic hydrocarbons can be derived from sources such as straight run or cracked petroleum fractions and coal tar. Hence, such aromatic hydrocarbons can serve as suitable starting material and can be readily converted into perhydroaromatics for use in the present process by complete hydrogenation utilizing a suitable catalyst. One suitable catalyst for this purpose is Raney nickel. Appropriate hydrogenation conditions when using this catalyst include a temperature of 200°–275°C., a hydrogen pressure of 2,000–4,000 p.s.i.g., a catalyst to hydrocarbon weight ratio of 1:4 to 1:20 and a reaction time of 2–12 hours. Other suitable catalysts that can be used include platinum, colbalt molybdate, nickel tungstate, or nickel sulfide-tungsten sulfide, with these hydrogenating components being deposited on alumina. Platinum reforming catalysts available commercially can be used for this purpose. These and other catalysts generally are used at the same pressure but at higher temperatures than Raney nickel, such as 300°–400°C., in order to effect complete hydrogenation of the aromatic hydrocarbon.

Table I gives examples of aromatic hydrocarbons that can be hydrogenated to produce perhydroaromatics for use in the present process.

TABLE I

| Aromatic | Number of carbon atoms | Structural formula |
|---|---|---|
| Acenaphthene | 12 | |
| 2,3-cyclopentanoindane | 12 | |

| Aromatic | Number of carbon atoms | Structural formula |
|---|---|---|
| Hydrindacene | 12 | |
| 6,7-cyclopentanoindane | 12 | |
| Fluorene | 13 | |
| 1,2-cyclopentanonaphthalene | 13 | |
| 2,3-cyclopentanonaphthalene | 13 | |
| Phenalene (perinaphthene) | 13 | |
| Homotetraphthene | 13 | |
| Anthracene | 14 | |
| Phenanthrene | 14 | |
| Indane-1-spiro cyclohexane | 14 | |
| Tetralin-2-spiro cyclopentane | $C_{14}$ | |
| 1,2-; 3,4-dibenzocycloheptatriene | $C_{15}$ | 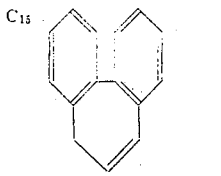 |
| 2-methylanthracene | $C_{15}$ | 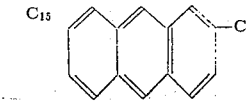 |

The compounds shown in Table I are merely exemplary of the types of aromatics that can be converted by hydrogenation into perhydroaromatics which are useful in practicing the present invention. Numerous other aromatics having at least three fused rings and from twelve-fifteen carbon atoms can also be used. These include aromatics having non-cyclic substituents such as methyl and ethyl groups as well as olefinic or acetylenic groups. In other words any tricyclic aromatic of the $C_{12}$–$C_{30}$ range or any mixture thereof after complete hydrogenation can be used as feed stock for the present process.

The alkyl adamantanes useful for the process of this invention can be any monool or diol adamantane hydrocarbon having zero to four alkyl and/or cycloalkyl substituents. The alkyl substituents can range from methyl to nonyl, with the total number of alkyl carbon atoms per molecule not exceeding nine. The alkyl or hydroxyl substituents can be located at either bridgehead or nonbridgehead provided that at least one bridgehead position remains unsubstituted. Substantially the same results will be obtained regardless of the original position of the –OH radical on the nucleus, inasmuch as immediate isomerization of the –OH to an unsubstituted bridgehead position on the nucleus occurs in the presence of the strong acids used in the process.

The adamantane nucleus has ten carbon atoms, four of which are bridgehead carbons that are equivalent to each other as can be seen from the following structural formula:

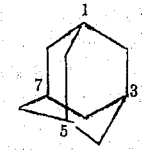

as shown, the bridgehead carbon atoms customarily are designated by the numerals 1, 3, 5, and 7 respectively and these bridgehead positions are all equivalent other in the nuclear structure.

Procedures for converting adamantane hydrocarbons to bridgehead hydroxy derivatives have been described in the prior art. Schneider, U.S. Pat. No. 3,356,740, dated Dec. 5, 1967, discloses the conversion of alkyladamantanes to bridgehead alcohols by air oxidation using a soluble metallic organic salt as catalyst, as also does Schneider, U.S. Pat. No. 3,450,775, dated June 17, 1969. Moore U.S. Pat. No. 3,383,424 dated May 14, 1968, shows the oxidation of alkyladamantanes by means of chromic acid in aqueous acetic acid under conditions to produce either monools or diols.

The preparation of nonbridgehead adamantanols containing nonbridgehead alkyl groups from adamantane and their conversion to the corresponding nonbridgehead alkyladamantanes have been described by Landa et al. Collection Czechoslov. Chem. Commun.,/Vol. 32/(1967). Alkyladamantanols in which the hydroxy group is at a nonbridgehead position can be made similarly from keto derivatives of alkyladamantanes which are obtained as by-products of the air oxidation process disclosed in aforesaid Schneider, U.S. Pat. No. 3,356,740. Conversion of the keto group can be carried out by a Grignard synthesis in the manner described in the aforesaid Landa et al. reference of by Schleyer et al., JACS, 83, 186, which shows the reaction of adamantane with methyl iodide and magnesium to yield 2-methyladamantanol-2. In analogous fashion the keto by-products of U.S. Pat. No. 3,356,740 can be converted to nonbridgehead alkyladamantanols also having at the nonbridgehead position an ethyl, n-propyl or isopropyl substituent in addition to the alkyl substituents that were present in the starting alkyladamantane hydrocarbon.

The following examples illustrate the invention and are presented without any intention that the invention be limited thereto.

EXAMPLE I

Perhydrophenalene (2.49 grams 0.014 moles) is added with good stirring to 3,5-dimethyl-1-adamantano (2.52grams-0.014 moles) dissolved in 25 ml of sulfuric acid having a strength of 100 $H_2SO_4$. The resulting reaction mixture is stirred vigorously for 1 hour at room temperature. The mixture was extracted several times with n-pentane to remove the hydrocarbon products and unreacted perhydrophenalene. The acid layer is poured slowly over cracked ice (about 0.5 kilogram) and the aqueous layer extracted several times with diethyl ether. The ether extracts are combined, washed with water and with 10 percent (by weight) solution of sodium carbonate, dried and evaporated. The residue was analyzed by vapor phase chromatography, infra-red, nuclear magnetic resonance and mass spectrometry and determined to be 2,4,5,6,7,8,9,9a-octahydrophenalene having the formula

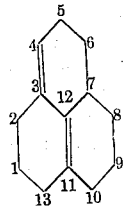

and some dimeric material. The conjugated diene was separated from the dimeric material by distillation and the yield was 50 percent based on theory.

EXAMPLE II

Perhydrofluorene following the procedure of Example 1, is converted to a mixture of the conjugated dienes having the following formulas:

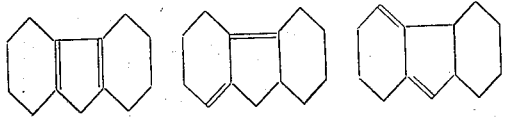

Specifically, 2.49 grams (0.014 moles) perhydroflorene is added with stirring to 2.52 grams 0.014 moles) 3,5-dimethyl-1-adamantanol dissolved in 25 ml of sulfuric acid having strength of 100% $H_2SO_4$. After a 2 hour reaction period at room temperature the separation and techniques set out in Example 1 were employed. The yield of conjugated diene was 75 percent based on reacted perhydrofluorene.

EXAMPLE III

Perhydrophenanthrene (2.66 grams —0.014 moles) was added with good stirring to 2.52 grams (0.014 moles) of 3,5-dimethyl-1- adamantanol dissolved in 25 ml. of sulfuric acid having a strength of 100% $H_2SO_4$. The resulting reaction mixture is stirred vigorously for 1 hour at room temperature. After following the separation and analytical procedures set out in Example I, a mixture of conjugated dienes of the following formulae were determined:

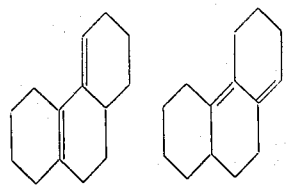

the remainder of the products was trans, anti, trans perhydrophenanthrene. The yield of the conjugated diene was 20 based percent on theory.

I claim:

1. A process for the preparation of polycyclic conjugated dienes which comprises contacting (a) a polycyclic naphthene having 3 to 11 rings of 5 to 6 carbon atoms each of which at least three are adjacent fused rings with (b) a strong acid of the group consisting of sulfuric acid with a strength of 100–105 $H_2SO_4$ equivalent by weight, polyphosphoric acid, HF·$BF_3$ and boron trifluoride etherate and (c) monool or diol of adamantane hydrocarbon having 0 to 4 alkyl groups with at least one alkyl group at a nonbridgehead position when the number of alkyl groups is four, said contacting being effected at a reaction temperature between the freezing point of the acid and 50° C., and recovering a polycyclic conjugated diene from the reaction mixture.

2. The process according to claim 1 wherein the polycyclic naphthene contains 14 carbon atoms and the monool or diol of an adamantane hydrocarbon is 3,5-dimethyl-1-adamantanol.

3. The process according to claim 1 wherein the polycyclic naphthene contains 13 carbon atoms and the monool or diol of an adamantane hydrocarbon is 3,5-dimethyl-1-adamantol.

4. The process of claim 1 wherein the strong acid is fuming sulfuric acid.

5. The process of claim 1 wherein the strong acid is in the range of 100–103% $H_2SO_4$ equivalent by weight and the reaction temperaturee is maintained at about 20° C.

6. A process of preparing 2,4,5,6,7,8,9, 9a-octahydrophenalene which comprises contacting perhydrophenalene with sulfuric acid having a strength corresponding to 100–130% $H_2SO_4$ equivalent by weight and 3,5-dimethyl-1-adamantanol said contacting being effected at a reaction temperature between the freezing point of the acid and 50° C. and recovering 2, 4, 5, 6, 7, 8, 9, 9a-octahydrophenalene from the reaction mixture.

7. The process according to claim 6 wherein the temperature is in the range of 15°–40° C.

8. The compound 2, 4, 5, 6, 7, 8, 9, 9a-octahydrophenalene.

* * * * *